3,002,401
DIFFERENTIAL LOCK FOR PROPULSION OF LAWN MOWERS, ETC.

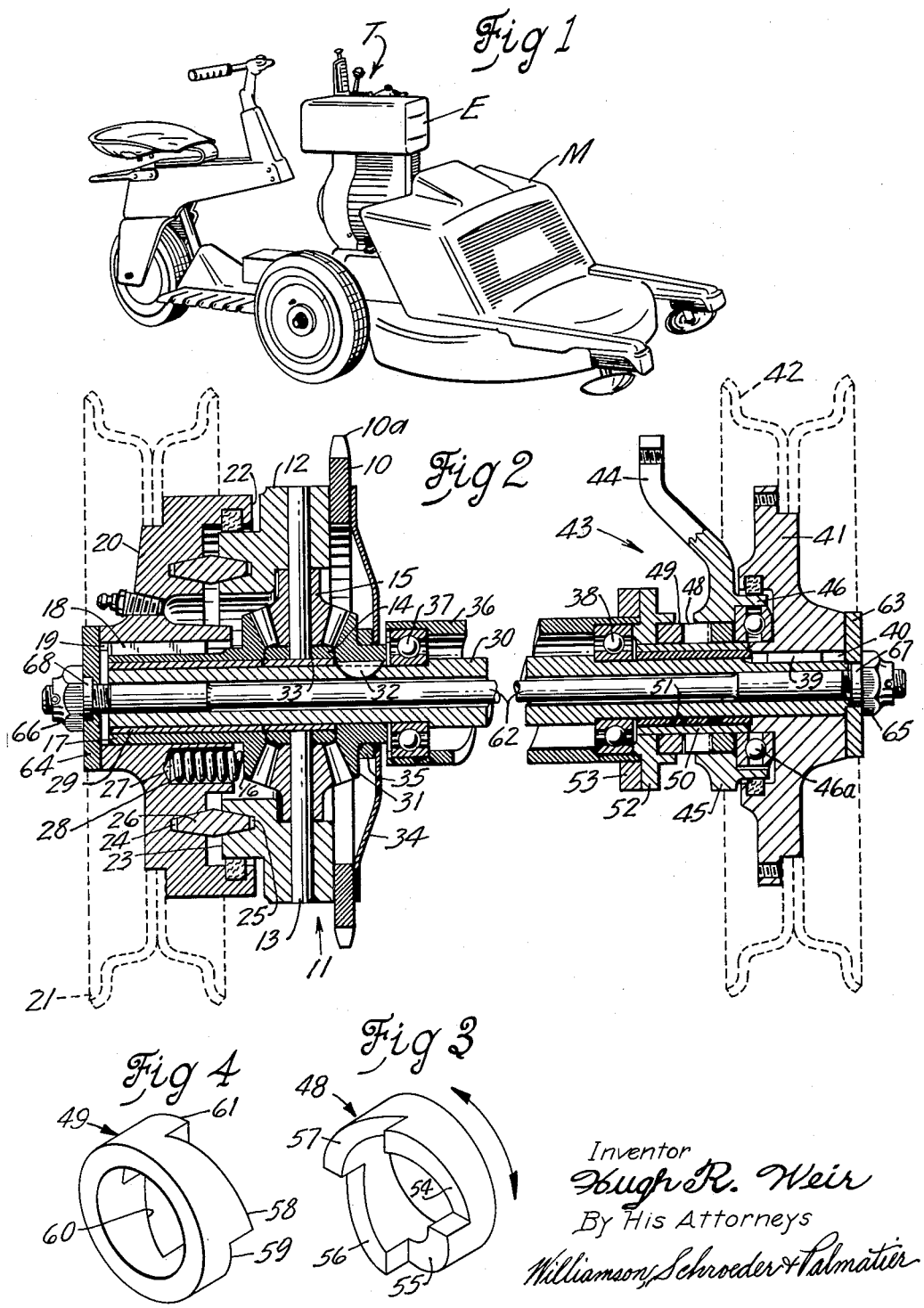

Hugh R. Weir, Minneapolis, Minn., assignor to Toro Manufacturing Corporation, Minneapolis, Minn., a corporation of Minnesota
Filed Feb. 5, 1959, Ser. No. 791,362
11 Claims. (Cl. 74—710.5)

This invention relates to a mechanism for interlocking ground traversing wheels of a vehicle from differential rotative movement to common rotative movement and more specifically to a mechanism for interlocking ground traversing wheels of a self propelled vehicle from differential drive to a common drive.

In self propelled implements having a differential drive for the ground wheels, it is often times desirable to interlock the ground wheels from a differential drive to a common drive. The common drive for ground wheels is necessary to attain a desirable working action of the implement tool. This is especially true in self propelled mowers where the terrain is uneven. It is difficult to obtain a straight swath when traversing uneven terrain because of slippage resulting from different traction of the ground wheels in vehicles merely having the conventional differential drive. The present invention is directed toward overcoming problems of this kind.

It is the general object of my invention to provide a novel mechanism for interlocking ground traversing wheels of a vehicle from differential rotative movement to common rotative movement.

It is another object of my invention to provide a novel mechanism for interlocking the ground traversing wheels of a self propelled vehicle from a differential drive to a common drive.

A more specific object of my invention is to provide a self propelled vehicle having an implement such as a power driven rotary mower secured thereto with a novel mechanism for interlocking ground traversing wheels of the vehicle from a differential drive to a common drive.

These and other objects and advantages of my invention will more fully appear from the following description, made in connection with the accompanying drawings, wherein like reference characters refer to the same or similar parts throughout the several views, and in which:

FIG. 1 is a view in perspective of a self propelled vehicle, incorporating the present invention and having a power driven rotary mower secured thereto;

FIG. 2 is a transverse cross section of the ground traversing wheel and axle assembly which incorporates the present invention;

FIG. 3 is a view in perspective of the rotary cam means; and

FIG. 4 is a view in perspective of the fixed cam means.

FIG. 1 shows a view in perspective of a self propelled vehicle T, which incorporates an embodiment of my invention, having an engine E for driving the ground traversing wheels. Secured to vehicle T is a power driven rotary mower M. Power driven mower M is drivingly connected to the conventional power take-off of vehicle T. Referring now to FIG. 2 in which one embodiment of my invention is shown, a sprocket 10 has teeth 10a over which is entrained a chain (not shown) connected to the power take-off of the vehicle. Sprocket 10 is fixedly secured to a differential gear assembly 11. Differential gear assembly 11 includes a carrier or housing 12 having bores formed therein. A plurality of spindles 13 are fixedly disposed within the bores of the carrier 12. Thrust bearings 14 are fixed to the inner end of spindles 13. Journalled on spindles 13 are a plurality of differential gears 15 for rotation about spindles 13.

A first bevel gear 16 enmeshes with differential gears 15. First bevel gear 16 has formed integrally therewith a tubular axle member 17. Affixed to tubular axle member 17 is a key 18 which is disposed within a keyway 19 formed in the left wheel hub 20. Keyway 19 is of greater longitudinal length than key 18 which permits axial shifting of wheel hub 20. Left wheel hub 20 provides a mounting for wheel 21. Left wheel hub 20 has an inner face 22 which has an annular groove 24 formed therein. Carrier 12 has an outer face 23 with an annular groove 25 formed therein. It can be seen that face 22 is spaced from face 23 and that annular grooves 24 and 25 are in substantially diametrically opposed relationship. The inner face 22 of left wheel hub 20 has a plurality of recesses 27 formed therein, although in FIG. 2 only one such recess is shown. Interposed between faces 22 and 23 of wheel hub 20 and carrier 12 respectively is an interlocking wedge element 26. Wedge element 26 is in the shape of an O ring and may be made of the material used in a conventional brake shoe. In cross section, wedge element 26 is outwardly tapered as shown in FIG. 2. When the wheels are interrelated for differential drive, wedge element 26 loosely engages in grooves 24 and 25 which permits differential rotation of wheel hub 20 and carrier 12. When wheel hub 20 is shifted inwardly, in a manner to be later described, wedge element 26 is in binding contact with grooves 24 and 25 whereby wheel hub 20 is locked to carrier 12. Disposed within recesses 27 are springs 28 which engage at their inner ends first bevel gear 16.

Axially disposed within axle member 17 is a sleeve bearing 29 which in turn is axially disposed around a second tubular axle member 30 which permits relative rotation of axle members 17 and 30. A second bevel gear 31 is fixed to second axle member 30 by means of a key 32. A sleeve 33 is axially disposed around axle member 30 and is in abutting relationship with sleeve 29. Sleeve 33 provides a bearing surface to permit relative rotation between axle 30 and differential gear assembly 11. The differential gear assembly 11 is provided with a shield member 34 having a spacer element 35. An axle housing 36 is axially disposed around axle 30 and mounted to permit relative rotation of axle member 30 within said housing by means of ball bearings 37 and 38. Axle member 30 is provided at its outer end with a key 39 which is disposed within a keyway 40 formed in right wheel hub 41. Right wheel hub 41 provides a mounting for a wheel 42.

Reference character 43 designates a cam actuating assembly. Cam actuating assembly 43 comprises a cam actuating lever portion 44 and a ring shaped body portion 45. Ring shaped body portion 45 has formed thereon an outwardly extending cylindrical portion 46 in which are disposed thrust ball bearing 47. As shown in FIG. 2, the inner race of thrust ball bearing 47 is in bearing engagement with rotary annular cam 48 and cylindrical portion 46 while the outer race is in bearing engagement with wheel hub 41. This arrangement permits relative rotative movement between wheel hub 41 and cam actuating assembly 43. Fixed to the inner annular surface of ring shaped body portion 45 is a movable rotary cam 48. Movable rotary cam 48 may be pressed into fixed annular relation with ring shaped body portion 45. A fixed cam 49 is in mating engagement with rotary cam 48. Rotary cam 48 is journalled for rotation about a sleeve 50. Sleeve 50 is axially disposed about a sleeve bearing 51 which in turn is disposed around axle member 30. Sleeve bearing 51 and sleeve 50 permit relative rotation between rotary cam 48 and axle member 30. Fixed cam 49 is pressed into fixed relation with sleeve 50. A cylindrical bearing member 52 fixedly receives fixed cam 49. The outer peripheral edge of cylindrical bearing member 52 engages a collar element 53 secured to axle housing 36. The cylindrical bearing member 52 and collar 53 function as a thrust bearing for fixed cam 49.

Referring now to FIG. 3 which shows a perspective view of rotary cam member 48. It will be seen rotary cam 48 has a plurality of sloping camming faces 54, 55, 56 and 57. FIG. 4 shows a perspective view of fixed cam member 49. It will be seen that fixed camming member 49 has a plurality of mating sloping camming faces 58, 59, 60 and 61. In ordinary differential drives the camming faces in rotary cam 48 are in mating engagement with the camming faces of fixed cam 49. As rotary cam member 47 is rotated in a forward manner, as indicated by arrows in FIG. 3, the sloping camming faces of rotary cam member ride over the mating sloping faces in fixed cam 49. Cam 48 thus exerts an outwardly axial force on wheel hub 41.

Axially disposed within tubular axle member 30 is a thrust transmitting rod 62. Disposed around the outer end of thrust rod 62 are thrust washers 63 and 64. Lock nuts 65 and 66 are secured to the outer threaded ends of thrust transmitting rod 62. Sleeve bearings 67 and 68 are disposed around thrust rod 62 in bearing engagement with thrust washers 63 and 64. Bearings 67 and 68 permit tubular axle member 30 to rotate about thrust rod 62.

Ordinarily during normal operation, the ground traversing wheels of vehicle T are interrelated for conventional differential drive whereby the wheels may revolve at different speeds when subjected to varying loads. However, it is often times desirable, in self propelled mowers, to have the wheels locked for common drive in order to obtain a straight swath. This is difficult when the vehicle is traversing uneven terrain because of slippage sometimes occuring when the ground wheels are subjected to varying loads. Therefore, when the operator of the self propelled vehicle desires the wheels to be interlocked for common drive, cam actuating lever is rotated in a forward direction. The sloping faces of rotary cam 47 move over the sloping faces of fixed cam 48, thereby exerting a force against wheel hub 41 which force is transmitted through thrust washer 63 to thrust transmitting rod 62.

Thrust rod 62 and thrust washer 64 impart a pulling action on wheel hub 20 whereby wheel hub is shifted in an inward axial direction against the bias of springs 28. As wheel hub 20 shifts inwardly toward carrier 12, the tapered ends of wedge element 26 are engaged in binding contact with grooves 24 and 25 to thereby lock wheel hub 20 to carrier 12. Wheel hub 20 is then driven directly by sprocket 10 and carrier 12. This drive is transmitted through axle member 17, first bevel gear 16, differential gears 15, second bevel gear 31, axle member 30 to wheel hub 41 whereby the wheels are locked for common drive.

When cam actuating lever 44 is rotated rearwardly, springs 28 urge wheel hub 20 in outward, axial direction out of binding contact with wedge element 26 to thereby permit relative rotation between carrier 12 and wheel hub 20. Thus the ground wheels are then interrelated for differential drive.

It will, of course, be understood that various changes may be made in the form, details, arrangement and proportions of the parts without departing from the scope of my invention which consists of the matter shown and described herein and set forth in the appended claims.

What is claimed is:

1. Mechanism for interlocking a pair of ground traversing wheels of a vehicle from a differential rotative movement to a common driving movement, having in combination an axle assembly including a first tubular axle member secured to a first wheel structure for revolution therewith, a second tubular axle member secured to the second wheel structure for revolution therewith, means interrelating said axle members to provide differential rotative movement between said wheels, said interrelating means having a face structure spaced from said first wheel structure, interlocking means interposed between said face and said first wheel structure, one of said structures being shiftable relative to said other structure in an axial direction, actuating means for axially shifting said shiftable structure, said actuating means including an annular cam mounted in co-axial relation on one of said axle members for rotation and axial shifting relative thereto, and thrust transmitting rod disposed axially within at least one of said axle members and interconnecting said actuating means and shiftable structure and imparting axial force to said shiftable structure for axially shifting said shiftable structure toward said non-shiftable structure to thereby interlock said axle members for common rotative movement.

2. Mechanism for interlocking a pair of ground traversing wheels of a self propelled vehicle from a differential drive to the common drive having in combination an axle assembly including a first tubular axle member secured to a first wheel structure for revolution therewith, a second tubular axle member secured to the second wheel structure for revolution therewith, driven elements secured to said first and second axle members respectively, a differential gear carrier including gear means, said gear means engaging said driven elements to provide differential drive between said wheels, said differential gear carrier having a face structure spaced from said first wheel structure, interlocking means interposed between said face and first wheel structure, one of said structures being shiftable relative to said other structure in axial direction actuating means for axially shifting said shiftable structure, said actuating means including an annular cam mounted in co-axial relation on one of said axle members for rotation and axial shifting relative thereto, and thrust transmitting rod disposed axially within at least one of said axle members and interconnecting said actuating means and said shiftable structure and imparting axial force to said shiftable structure for axially shifting said shiftable structure toward the non-shiftable structure to thereby interlock said axle members for common drive.

3. The structure set forth in claim 2 and means normally urging said shiftable and non-shiftable structures apart to render inoperative said interlocking means.

4. Mechanism for interlocking a pair of ground traversing wheels of a self propelled vehicle from a differential drive to the common drive having in combination an axle assembly including a first axle member secured to a first wheel structure for revolution therewith, a second axle member secured to the second wheel structure for revolution therewith, driven elements secured to said first and second axle members respectively, a differential gear carrier including gear means engaging said driven elements to provide differential drive between said wheels, said differential gear carrier having a face structure spaced from said first wheel structure, interlocking means interposed between said face and first wheel structure, one of said structures being shiftable relative to said other structure in axial direction, actuating means for shifting said shiftable structure, and force transmitting means interconnecting said actuating means and shiftable structure, said force transmitting means including a thrust transmitting rod axially disposed within at least one of said axle members and imparting axial force to said shiftable structure for axially shifting said shiftable structure toward said non-shiftable structure to thereby interlock said axle members for common drive.

5. Mechanism for interlocking a pair of ground traversing wheels of a self propelled vehicle from a differential drive to the common drive having in combination an axle assembly including a first axle member secured to a first wheel structure for revolution therewith, a second axle member secured to the second wheel structure for revolution therewith, driven elements secured to said first and second axle members respectively, differential gear carrier structure including gear means, said gear means engaging said driven elements to provide differential drive between said wheels, said first wheel structure having a face, said differential gear carrier structure having a face spaced from the face of said first wheel structure, one of said structures being shiftable relative to said other structure in axial direction and actuating means for axially shifting said shiftable structure toward said non-shiftable structure, an interlocking wedge element interposed between said shiftable and non-shiftable structures, said interlocking wedge element engaging the faces of said shiftable and non-shiftable structures in binding relation to thereby interlock the two axial members for common drive when said shiftable structure is shifted toward said non-shiftable structure.

6. The structure set forth in claim 5 wherein said first wheel structure face and said differential gear carrier structure face each have an annular groove formed therein, said interlocking wedge element being disposed in said grooves.

7. The structure set forth in claim 5 and means normally urging said structures apart to render inoperative said interlocking wedge element.

8. Mechanism for interlocking a pair of ground traversing wheel structures of a self-propelled vehicle from a differential drive to a common drive having in combination an axle assembly including a first axle member secured to a wheel structure for revolution therewith, a second axle member secured to the second wheel structure for revolution therewith, driven elements secured to said first and second axle member respectively, differential gear carrier structure including spider gears engaging said driven elements to provide a differential drive between said wheels, said first wheel structure having a face, said differential gear carrier structure having a face spaced from the face of said first wheel structure, said wheel structure being shiftable towards said differential gear carrier structure in an axial direction, actuating means for axially shifting said wheel structure towards said differential gear carrier structure, interlocking means interposed between said wheel structure face and said differential gear carrier structure face, and force transmitting means interconnecting said actuating means and wheel structure including a thrust transmitting rod axially disposed within said axle members and serving to impart axial force to said wheel structure for axial shifting thereof towards said differential gear carrier structure to thereby interlock said axle members for common drive.

9. The structure as defined in claim 8 wherein said actuating means includes an annular cam member mounted in co-axial relation on one of said axle members for rotation and axial shifting relative thereto.

10. The structure as defined in claim 8 and means normally urging said structures apart to render inoperative said interlocking means.

11. The structure as defined in claim 8 wherein said wheel structure face and said differential gear carrier structure face are each provided with an annular groove, and said interlocking means includes an annular element formed of compressible material, said annular element in cross-sectional shape having oppositely tapering groove-engaging portions positioned with said grooves.

References Cited in the file of this patent

UNITED STATES PATENTS

| | | |
|---|---|---|
| 843,288 | Master | Feb. 5, 1907 |
| 863,864 | Master | Aug. 20, 1907 |
| 1,014,990 | Alborn | Jan. 16, 1912 |
| 1,111,728 | Besserdich et al. | Sept. 29, 1914 |
| 1,625,769 | Ersted | Apr. 19, 1927 |
| 2,559,944 | Chapp | July 10, 1951 |
| 2,679,769 | Parrett | June 1, 1954 |

FOREIGN PATENTS

| | | |
|---|---|---|
| 14,228 | Great Britain | Jan. 16, 1913 |